United States Patent Office 3,666,536
Patented May 30, 1972

3,666,536
MODIFICATION OF SURFACES WITH NITRENES
Douglas A. Olsen, Minneapolis, and A. Jean Osteraas, St. Paul, Minn., assignors to Ashland Oil, Inc.
No Drawing. Continuation of application Ser. No. 504,174, Oct. 23, 1965. This application May 18, 1970, Ser. No. 37,469
Int. Cl. C23c *11/00, 9/00*
U.S. Cl. 117—106 R
16 Claims

ABSTRACT OF THE DISCLOSURE

Organic and inorganic surfaces, including surfaces of metals such as stainless steel and polymers are modified by interaction with nitrenes, such as :NH generated by pyrolysis of chloramine, to produce a monomolecular-like modified surface which may exhibit modified properties of adhesion, surface tension, a low coefficient of friction, electrical resistance, corrosivity, permeability, durability and lubricity, as compared to an otherwise similar unmodified surface.

---

This application is a continuation of parent application Ser. No. 504,174, filed Oct. 23, 1965, now abandoned.

The present invention relates to the modification of surfaces of solid materials with nitrenes. In another aspect, it relates to solid materials having novel modified surfaces. In a further aspect, it relates to the modification of the surfaces of solid organic and inorganic articles, such as shaped organic polymer articles (e.g., polyethylene film) and metal substrates (e.g., stainless steel), to alter properties thereof, such as critical surface tension, and thereby increase the utility of such articles.

The nitrene modified surfaces of the present invention are obtained by exposing a solid surface to nitrenes having the general formula :NR wherein R is hydrogen or an organic radical.

The present invention is based on the discovery that nitrenes can be employed to alter surface properties of solid surfaces, such as organic solid surfaces, i.e., surfaces containing carbon-hydrogen bonds, and inorganic solid surfaces devoid of such bonds. The nature of the interaction between the surface and the nitrene is not clearly understood, although more than a mere deposition or adsorption of the nitrene occurs. Advanced analytical tools (such as infrared attenuated total reflectance) is incapable of detecting or measuring the magnitude of the modified surface. However, alterations of such surface properties as critical surface tension do result and can be determined. Thus, the modified surface brought about by this invention is monomolecular in character. Nothwithstanding the minute magnitude of the modified surface, the invention has great utility and versatility. For example, the treatment of a surface with a nitrene results in the solid surface having properties like that of a surface naturally containing —NR groups, wherein R has the aforesaid meaning. It will be apparent that, depending on the nature of the R substituent on the nitrene, widely different surface properties can be achieved.

Nitrenes are extremely active biradicals, intermediates or compounds of nitrogen containing a single substituent. The preparation and identification of these nitrenes has been described in the literature, such as in Chemical Reviews, volume 64, p. 149 (1964). Generally, nitrenes are prepared by the pyrolysis or photolysis of a suitable precursor. Although both methods are suitably employed in the process of the present invention, other methods of generating the nitrene can be used, such as catalysis and actinic radiation.

Any nitrene which has a finite half-life suitable to achieve a desired modification of a solid surface can be used in this invention, though the nitrenes may be limited by the availability of a precursor for the nitrene and the particular change in surface properties desired.

The preferred nitrenes falling within the general formula :NR are those in which R is hydrogen, alkyl, haloalkyl, aryl, arylalkyl, carboalkoxy, sulfonyl or cyano. Subclasses of nitrenes which are useful in the practice of this invention representatively include alkylnitrenes, halogenated alkylnitrenes, arylnitrenes, arylalkylnitrenes, carboalkoxynitrenes, sulfonylnitrenes, cyanonitrenes, and the like.

The following table illustrates representative species of nitrene precursors and the nitrene obtained from the precursor.

TABLE I

| Precursor | Nitrene |
|---|---|
| $NH_2Cl$ | :NH (nitrene or imidogen) |
| $NH_2OSO_3H$ | :NH |
| $NH_2OSO_3Na$ | :NH |
| $HN_3$ | :NH |
| $\phi-(CH_2)_2N_3$ | :N(CH$_2$)$_2\phi$ |
| $CH_3(CH_2)_2N_3$ | :N(CH$_2$)$_2$CH$_3$ |
| $CH_3(CH_2)_6N_3$ | :N(CH$_2$)$_6$CH$_3$ |
| $N_3-\overset{O}{\overset{\|}{C}}OCH_2CH_3$ | :N—$\overset{O}{\overset{\|}{C}}$OCH$_2$CH$_3$ |
| $N_3CN$ | :NCN |
| $HCN + F_2$ | :NCF$_3$ |
| $\phi-SO_2N_3$ | :NSO$_2-\phi$ |
| $\phi-N_3$ | :N—$\phi$ |
| $\phi-NO_2$ | :N—$\phi$ |
| $\phi-NO + (EtO)_3P$ | :N—$\phi$ |

The nitrene modification of this invention can be utilized to modify the surfaces of solid materials or semi-solid materials in which the surface molecules treated with the nitrene remain at the surface when the material is subsequently employed. The term solid, therefore, as used herein is intended to include those materials which during exposure can assume a semi-solid state (e.g., as in the case of a melt or an amorphous material) but in which the surface molecules remain at the surface in the subsequent utilization of the material. The solid materials include normally solid or solidified organic solid materials having carbon-hydrogen bonds (though they can in addition contain functional groups such as an ester group) and inorganic materials devoid of carbon-hydrogen bonds.

Solid polymeric materials, the surfaces of which can be modified with nitrenes to alter surface properties thereof, include addition and condensation polymers, whether synthetic or natural. Such synthetic addition polymers include polyolefins such as polyethylene, polypropylene, polyisobutylene, or ethylene-alpha-olefin copolymers; acrylic polymers, such as polyacrylate, polymethylmethacrylate, or polyethylacrylate; vinyl halide polymers and copolymers, such as polyvinyl chloride; polyvinyl ethers, such as polyvinyl methyl ethers; polyvinylidene halides, such as polyvinylidene fluoride or polyvinylidene chloride; polyacrylonitrile; polyvinyl ketones; polyvinyl amines; polyvinyl aromatics, such as polystyrene; polyvinyl esters, such as polyvinyl acetate; and copolymers of vinyl monomers with each other and olefins, e.g., ethylene-methyl methacrylate copolymers, acrylonitrile-styrene copolymers, and ethylene-vinyl acetate copolymers, and the like. Synthetic and natural rubers such as butadiene-styrene copolymers, polyisoprene, polybutadiene, butadiene-acrylonitrile copolymers, neoprene, polyisobutylene rubbers, ethylene-propylene rubbers, isobutylene-isoprene copolymers, and polyurethane rubbers are further addition polymers which can be modified in accordance with the present invention. Condensation polymers, the surfaces of which are suitably modified according to this invention, include polyamides such as polycaprolactam, polyesters such as polyethylene terephthalate, alkyd resins, phenol formaldehyde resins, urea-formaldehyde resins, phenol-furfural resins, resorcinal-formaldehyde resins, melamine-formaldehyde resins, polycarbonates, polyoxymethylenes, polyimides, polyethers, epoxy resins, polyurethanes, and the like. Natural polymeric materials and chemically modified natural polymeric materials which can be employed include wool, cotton, silk, rayon, rayon triacetate, cellulose, cellulose acetate, cellulose butyrate, cellulose acetate-butyrate, cellophane, cellulose nitrate, cellulose propionate, cellulose ethers, carboxymethyl cellulose, and the like.

The inorganic surfaces which can be modified in accordance with this invention are solid or solidified elements and combintions thereof (e.g., compounds, alloys and mixtures) which do not have or are devoid of carbon-hydrogen bonds. Representative solid inorganic surfaces which can be modified include non-metals which are solid in their elementary state, such as graphite; metals, such as iron, aluminum, tin, copper and nickel; metal alloys, such as bronze and steel; metal oxides and other elemental oxides, such as magnesium oxide, silica, alumina, and titania; metal carbides; minerals, such as clay, pyrite and asbestos; salts, such as sodium chloride and calcium carbonate; and such synthetic compositions as glass and refractories.

The solid substrates can be of any shape, such as continuous or particulate, porous or impervious, and large or small. Thus, the process of this invention is applicable to the modification of crystals, powders, plates, strips, films, sheets, wire, fibers, fabrics, tubing cast, extruded or compressed articles, and the like. In the case of solid organic materials, such as polymers, this invention can be used to modify the surface of shaped articles thereof, such as bottles, bags, film, etc.

The process of modifying surfaces with nitrenes is, as indicated hereinabove, relatively simple and therefore of great utility and versatility. Basically, the preferred process comprises decomposing the nitrene precursor under conditions that permit the resulting nitrene to exist in a volatile gaseous state and contacting such gaseous nitrene with the surface to be modified, placed in close proximity to the decomposing precursor. The decomposition of the precursor, as described in the literature, is accomplished either by heating or pyrolyzing the precursor until it decomposes thereby releasing the desired nitrene or by subjecting the precursor to light energy, such as actinic radiation, which causes the decomposition of the precursor and the release of the nitrene. If desired, a combination of both methods can be employed. The precursor can be in the solid, liquid, or gaseous state when decomposing. It will be apparent that the rate of decomposition of the precursor will depend on the amount of energy supplied to the precursor. A high rate of decomposition will result in a high nitrene concentration. Pyrolysis was especially found to be a convenient means of generating nitrenes from the precursor. The particular temperatures required to provide a desired rate of nitrene formation will differ with each precursor and can be readily established experimentally by those skilled in the art upon being acquainted with this disclosure.

To a certain extent, the nature of the surface to be modified will determine the particular type of precursor employed and the means whereby the surface is modified. It will be apparent that the material to be modified generally should not become so hot during the treatment with nitrenes that the modified surface molecules of the material can migrate away from the surface. This limitation on the temperature can be similarly readily established experimentally by those skilled in the art since obviously the melting points of the suitable materials exemplified hereinabove can differ widely. It should be noted, however, that the surface temperature of the material being modified need not be that of the pyrolyzing precursor since it is not necessary to contact the precursor of the nitrene with the surface to be modified and only necessary to contact gaseous nitrene per se with the surface. In general, therefore, the precursor is maintained at a temperature which assures the formation of nitrenes without destroying the solid character of the surface to be modified.

The surface to be modified can be maintained at room temperature or at any lower or elevated temperature at which the solid character of the surface is retained, i.e., at which the surface molecules being modified remain at the surface. Various methods of keeping the surface being exposed from exceeding this limitation when such surface is in close proximity to a precursor requiring temperatures significantly exceeding the melting or degradation temperature of the material being exposed will be apparent, such as cooling during exposure, repeated short exposures with intermediate cooling, and the like. In many instances, it has been found desirable to maintain the surface to be exposed at some elevated temperature, although below that at which the solid character of the surface is lost.

The degree of surface modification obtained will depend of the particular substrate being modified as well as its smoothness or roughness, the rate of formation and concentration of the nitrene in the atmosphere to which the solid substrate is exposed, the exposure time of the surface of the substrate to the nitrene, the distance between the decomposing precursor and the surface during the exposure, and the half-life and diffusivity of the nitrenes. Since nitrenes employed in the modification have finite half-lives, it will be apparent that the shorter the distance the nitrene has to travel or diffuse before contacting the surface to be modified, the greater will be the amount of nitrene contacting the surface in a given unit of time. Once the desired properties have been achieved, no further exposure is necessary, although no adverse effects result from further exposure.

The exposure of the surface to the gaseous nitrene can be carried out at atmospheric pressure, at reduced pressure or vacuum, or at super-atmospheric pressures. Furthermore, the surface modification can be accomplished in the presence of air, an inert gas, or in the absence of any gaseous diluent. Genertally, an excess of the nitrene precursor is employed such that at the end of the exposure, unreacted precursor is present. More than one precursor giving rise to the same nitrene or to different nitrenes can be employed.

Specific embodiments of achieving the surface modification of the present invention comprise continuously passing the surface to be exposed over a bed of the nitrene precursor maintained at the desired pyrolysis temperature for sufficient length of time to allow a controlled amount of heating of the surface, as well as sufficient time to allow the nitrene to interact with the surface, or by passing the surface to be modified through a zone of gaseous pyrolyzing precursor. Other specific methods of modifying the surface include coating the precursor on the surface to be modified and then heating the coated surface to pyrolyze the precursor, spraying the precursor through a pyrolysis zone onto the surface to be modified, or passing a stream of gaseous nitrene through a particulate bed of the material to be modified so as to fluidize and modify the same.

The surface modification is obtained as a result of the interaction of the nitrene with the surface. The change in surface properties can be readily followed by the change in critical surface tension with exposure to nitrene, which critical surface tension approaches or achieves the critical surface tension of a surface naturally containing a high concentration of groups corresponding in chemical composition to those groups attached to the nitrene nitrogen. The modification of the surface is limited to the surface and is monomolecular in nature, since the modification cannot be detected by such analytical tools as infrared attenuated total reflectance. For example, when polyethylene and stainless steel surfaces were modified with nitrenes such as nitrene, heptylnitrene, and carbethoxynitrene, infared attenuated total reflectance did not reveal any bonds other than those of the untreated substrate, yet dramatic changes in critical surface tension were found.

The utility derivable from the present invention will be in part determined by the particular nature of the nitrene employed. Nitrenes when interacted with an organic surface appear to exist in the form of an amino group at the surface. Modification with nitrenes therefore constitutes a means of chemically activating any otherwise inert surface to allow further reaction with acidic compounds. Thus, nitrene modified surfaces will react with and bond acidic group containing dyes, stabilizers, anti-slip agents, antistatic agents, and similar acidic materials to the surface of a shaped polymeric material and thereby prevent their evaporation during use. The nitrene modified surfaces can be quaternized and this in itself causes antistatic properties to be improved. Other utilities of the nitrene modified surfaces of the present invention include modification of a solid surface to alter such properties thereof as adhesion, wettability, electrical resistance, lubricity, corrosivity, permeability, durability, etc.

As mentioned above, the extent of the surface modification achieved by this invention can be determined (depending on the physical form of the substrate) by measuring the critical surface tension ($\gamma_c$) of the substrate before and after the surface modification takes place. The determination of critical surface tension is a procedure known in the art wherein the degree of wetting, as measured by contact angles of drops of a series of known liquids on a planar surface of a given solid, is extrapolated to complete wetting (zero contact angle). The contact angles of the drops of liquid at the three-phase junction (i.e., solid-liquid-air) are then measured with a cross-hair equipped telescope (the telescope used in said determinations reported in said examples was an Eberbach No. 12–630 telescope). The cosines of the observed contact angles are then plotted against the surface tensions of the test liquids to a cosine of unity (i.e., complete wetting). The surface tension corresponding to a cosine of unity is defined as the critical surface tension of the surface under consideration and is a constant value independent of the liquids used in the determination. The critical surface tension of a surface is generally accepted as a good estimate of the true surface tension of the solid. Further information on this determination is omitted here in the interest of brevity and reference is made to the review by W. A. Zisman in "Advances in Chemistry Series," volume 43, page 1 (1964), published by the American Chemical Society, Washington, D.C.

This invention is further illustrated by the following examples, but it should be understood that the various materials and amounts thereof recited in these examples, as well as the conditions of treatment and other details, are not to be construed as unduly limiting this invention.

EXAMPLE I

A sample of a sheet (4″ x 2″ x ¼″) of low density polyethylene was exposed to nitrene generated by pyrolysis of chloramine (prepared by reaction of sodium hypochlorite and ammonia). The procedure used was to place the polyethylene sample on top of a Petri dish (9 cm. in diameter) containing 0.5 gram of chloramine spread on the bottom of the dish, and heat the assembly on a 385° C. hot plate, the exposure time being 5 min. After allowing the treated sample to cool, it was washed with water and dried. The critical surface tension of the treated polyethylene surface was determined and found to be 39 dynes/cm., as compared to a value of 31 dynes/cm. for the untreated surface.

EXAMPLE II

Samples of low density polyethylene were exposed in a number of runs to the nitrenes generated by pyrolysis of the sodium salt of hydroxyl amine-o-sulfonic acid, ethyl azidoformate, and heptyl azide. In each run, the sample of polyethylene was placed over a Pyrex glass planchet (22 cm. in diameter, 5 mm. in height) containing about 75 milligrams of the nitrene precursor pyrolyzed at about 325° C., the exposure time being less than 90 secs. The treated samples were cooled, washed with water, and dried. The critical surface tensions for the treated surfaces were determined and are set forth in the following Table II.

TABLE II

| Run | Nitrene precursor | Nitrene generated | Critical surface tension of treated polyethylene surface, dynes/cm. |
|---|---|---|---|
| 1 | $NaOSO_3NH_2$ | :NH | 39 |
| 2 | $N_3COOEt$ | :NCOOEt | 39 |
| 3 | $C_7H_{15}N_3$ | :$NC_7H_{15}$ | 32.5 |

In the treatment of polyethylene with nitrene generated by pyrolysis of $NaOSO_3NH_2$, the same value of 39 dynes/cm. was obtained whether the polyethylene sample was used at room temperature or first heated to its softening point (when it became clear and shiny), indicating that it is not necessary to first heat the polyethylene to its softening (or amorphous) point before treating it with the nitrene.

EXAMPLE III

Samples of various metal sheets were exposed in a number of runs to heptylnitrene, generated by pyrolysis of heptylazide. The procedure used was to place the sample on top of a 9 cm. Petri dish containing about 0.5 gram of heptyazide pyrolyzed at about 375° C., the exposure time being 1.5 min. The critical surface tensions obtained are set forth in the following Table III.

TABLE III

| Run | Metal substrate used | Critical surface tension of treated metal surface, dynes/cm. |
|---|---|---|
| 1 | Copper | 41.5 |
| 2 | Zinc | 45 |
| 3 | Steel (4040) | 53.5 |
| 4 | Steel (1020) | 47 |
| 5 | Magnesium | 50 |
| 6 | Aluminum | 51.5 |

EXAMPLE IV

The same procedure of Example III was followed in modifying the surfaces of stainless steel samples with the nitrenes generated from the sodium salt of hydroxyl amine-o-sulfonic acid, ethyl azidoformate, and heptylazide. Critical surface tensions for the treated samples of steel are set forth in the following Table IV.

TABLE IV

| Run | Nitrene precursor | Nitrene generated | Critical surface tension of treated steel surface, dynes/cm. |
|---|---|---|---|
| 1 | $NaOSO_3HN_2$ | :NH | 39 |
| 2 | $N_3COOEt$ | :NCOOEt | 40 |
| 3 | $C_7H_{15}N_3$ | :$NC_7H_{15}$ | 31 |

In the run made with heptylazide, a deposit of an oily material on the treated surface was observed, and the value of 31 dynes/cm. given above is for such oily surface. When this oily surface was washed with water, the critical surface tension of the washed surface was found to be 39 dynes/cm.

EXAMPLE V

Samples of kraft paper were exposed in a series of duplicate runs for various exposure times to heptylnitrene generated by pyrolysis of about 0.1 ml. of heptyl azide at about 325° C. The time of penetration of a water droplet on the resultant treated surface was then visually measured for each of the runs. Results are set forth in Table V.

TABLE V

| Exposure time, min. | Water penetration time, min. | |
|---|---|---|
| | Run 1 | Run 2 |
| 1 | 6.63 | 6.69 |
| 2 | 62 | 83 |
| 3 | 70 | 90 |

The data of Table V show that the nitrene-modified surface has a great degree of water repellancy, especially when compared to that of untreated or control kraft paper, which had a water penetration time of about 1.5 min.

EXAMPLE VI

A continuous strip of kraft paper (⅝" wide) was passed through a Pyrex glass tube (65 cm. x 4.6 cm.) inserted in a Lindberg Tube Furnace, No. 241, equipped with an Automatic Furnace Control 59344, and exposed therein to an atmosphere comprising heptylnitrene. The heptylnitrene was generated by bubbling a stream of nitrogen into a body of heptyl azide contained in an external aspirator and continuously passing the resultant nitrogen laden with heptyl azide vapor via a delivery tube into the furnace glass tube. The outlet of the delivery tube was located about in the center of the furnace glass tube below the strip of kraft paper. The heptyl azide was pyrolyzed at a temperature of about 325° C. to generate the heptylnitrene. Both ends of the furnace glass tube were capped with aluminum foil, provided with openings for the passage of the kraft paper strip. The exposure time of the kraft paper strip to the heptylnitrene in the furnace was varied from time to time by regulating the speed of passage of the strip, and generally about 3–4 ft. of the strip was exposed during each period. Following exposure, the time of penetration water droplets dropped on the top and bottom of samples of the treated strip were determined. Results are summarized in Table VI.

TABLE VI

| Residence time of draft paper sample, min. | Time of penetration of water droplets on treated kraft paper, min. | |
|---|---|---|
| | Top surface of sample | Bottom surface of sample |
| 0.52 | 4.42 | 2.66 |
| 0.7 | 4.46 | 6.28 |
| 0.9 | 4.19 | 12.04 |
| 1.4 | 5.28 | 17.12 |
| 3.0 | 3.03 | 19.40 |
| 4.0 | 4.14 | 21.94 |
| 5.0 | 4.65 | 21.92 |
| 6.0 | 4.74 | 18.83 |

The above data of Table VI show that the nitrene-modified surface has a great degree of water repellancy, especially when compared to that of untreated or control kraft paper, which had a water penetration of about 1.5 min.

The foregoing examples illustrate the modification of surfaces with nitrenes. It is to be understood that the invention is not intended to be limited to the particular nitrenes illustrated nor to the particular methods employed to form the nitrenes and to contact the surface to be modified. Employing the described methods, other nitrenes can be employed to modify the surfaces of other materials. Similarly, other methods of contacting the nitrenes with the surface to be modified are included within the scope of the invention. If desired, more than one type of nitrene can be employed, simultaneously or in turn, to modify surfaces of solid materials.

We claim:
1. A method for modifying the surface of a solid material containing carbon-hydrogen bonds which comprises contacting said surface with a nitrene.
2. A method for modifying the surface of a material containing carbon-hydrogen bonds in the solid state, which comprises contacting said surface with a nitrene having the general formula: NR wherein R is selected from the group consisting of hydrogen, alkyl, haloalkyl, aryl, arylalkyl, carbonalkoxy, sulfonyl, and cyano, said nitrene being in the gaseous state when contacting said surface.
3. A method of modifying the surface of a material containing carbon-hydrogen bonds which comprises contacting such surface in the solid state with a nitrene, said nitrene being generated by pyrolysis of a nitrene precursor.
4. A method for modifying the surface of a material containing carbon-hydrogen bonds which comprises contacting such surface in the solid state with a nitrene, said nitrene being in the gaseous state when contacting said surface.
5. A solid substrate of material containing carbon-hydrogen bonds and having a surface which has been modified by contact with a nitrene.
6. A solid substrate containing carbon-hydrogen bonds having a surface which has been modified by contact with a nitrene.
7. A polyethylene substrate having a surface the critical surface tension of which has been modified by contact with a nitrene produced by decomposition of chloramine, the sodium salt of hydroxyl-o-sulfonic acid, ethyl azidoformate, or heptyl azide.
8. A steel substrate having a surface the critical surface tension of which has been modified by contact with a nitrene produced by decomposition of chloramine, the sodium salt of hydroxyl-o-sulfonic acid, ethyl azidoformate, or heptyl azide.
9. A method for treating a solid material containing carbon-hydrogen bonds to impart thereto a critical surface tension which is modified as compared to the critical surface tension of the untreated material, comprising the steps of decomposing a nitrene precursor to form a nitrene and contacting said surface with said nitrene, at an elevated temperature below that at which the solid material loses to solid character, until a modification in critical surface tension has been produced.
10. A method for modifying the surface of a solid material which comprises contacting said surface with a nitrene, and wherein said material is an organic material containing carbon-hydrogen bonds.
11. A method for modifying the surface of a solid material which comprises contacting said surface with a nitrene, and wherein said material is a polymeric material.
12. The method of claim 11 wherein said polymeric material is polyethylene.
13. A method for treating the surface of a solid material to impart thereto a critical surface tension which is modified as compared to the critical surface tension of the untreated material, comprising the steps of decomposing a nitrene precursor to form a nitrene and contacting said surface with said nitrene, at an elevated temperature below that at which the solid materials loses its solid character, until a modification in critical surface tension has been produced, and wherein said surface is of polyethylene and said nitrene precursor is pyrolyzed to produce said nitrene.
14. A method for treating the surface of a solid material to impart thereto a critical surface tension which is modified as compared to the critical surface tension of the untreated material, comprising the steps of decomposing a nitrene precursor to form a nitrene and contacting said surface with said nitrene, at an elevated temperature below that at which the solid material loses its solid character, until a modification in critical surface tension has been produced, wherein said surface is of steel and said nitrene precursor is pyrolyzed to produce said nitrene, and is the sodium salt to hydroxyl amine-o-sulfonic acid.

15. A method for treating the surface of a solid material to impart thereto a critical surface tension which is modified as compared to the critical surface tension of the untreated material, comprising the steps of decomposing a nitrene precursor to form a nitrene and contacting said surface with said nitrene, at an elevated temperature below that at which the solid material loses its solid character, until a modification in critical surface tension has been produced, and wherein said surface is of steel and said nitrene precursor is pyrolyzed to produce said nitrene, and is heptyl oxide.

16. A method for treating the surface of a solid material to impart thereto a critical surface tension which is modified as compared to the critical surface tension of the untreated material, comprising the steps of decomposing a nitrene precursor to form a nitrene and contacting said surface with said nitrene, at an elevated temperature below that at which the solid material loses its solid character, until a modification in critical surface tension has been produced, and wherein said surface is of steel and said nitrene precursor is pyrolyzed to produce said nitrene, and is ethyl azidoformate.

References Cited

Gundry et al.: J. Catalysis in Chem. Abst. 3523(e).

Ozaki et al.: Proc. Roy. Soc. (London) in Chem. Abst. 2245(g).

ALFRED L. LEAVITT, Primary Examiner

M. F. ESPOSITO, Assistant Examiner

U.S. Cl. X.R.

117—93. 93.1, 118